United States Patent [19]

Drobot et al.

[11] 4,293,334

[45] Oct. 6, 1981

[54] RECOVERY OF METALS

[75] Inventors: Walter Drobot, Montclair; Hubert A. Lechavelier, Piscataway, both of N.J.

[73] Assignee: Engelhard Minerals & Chemicals Corporation, Iselin, N.J.

[21] Appl. No.: 120,800

[22] Filed: Feb. 12, 1980

[51] Int. Cl.³ ............... C22B 11/04; C22B 15/12; C22B 21/00; C22B 23/04

[52] U.S. Cl. ............... 75/101 BE; 75/108; 75/117; 75/118 R; 75/118 P; 75/119; 75/120; 75/121; 210/601; 210/688; 423/22; 423/24; 423/53; 423/100; 423/112; 423/139

[58] Field of Search ............ 75/101 BE, 108, 117, 75/118 R, 118 P, 119, 120, 121; 423/22, 24, 53, 100, 112, 139; 210/38 B, 2

[56] References Cited

U.S. PATENT DOCUMENTS

| | | | |
|---|---|---|---|
| 3,151,038 | 9/1964 | Gray | 435/254 |
| 4,021,368 | 5/1977 | Nemec et al. | 210/38 B X |
| 4,067,821 | 1/1978 | Votapek et al. | 210/38 B X |

*Primary Examiner*—G. Ozaki

[57] ABSTRACT

A process for the recovery of valuable metals or their compounds from an aqueous medium, such as a metals refinery process waste solution. Metals are recovered in water-insoluble form from aqueous solutions of metal salts by contacting the aqueous solution with a killed fungus of the type commonly called molds for a period of time sufficient to convert soluble metal components in the aqueous solution to a water insoluble form sequestered by the dead fungus. After treatment, metals-containing fungus is separated from the treated aqueous medium and processed for the recovery of metal values.

13 Claims, 1 Drawing Figure

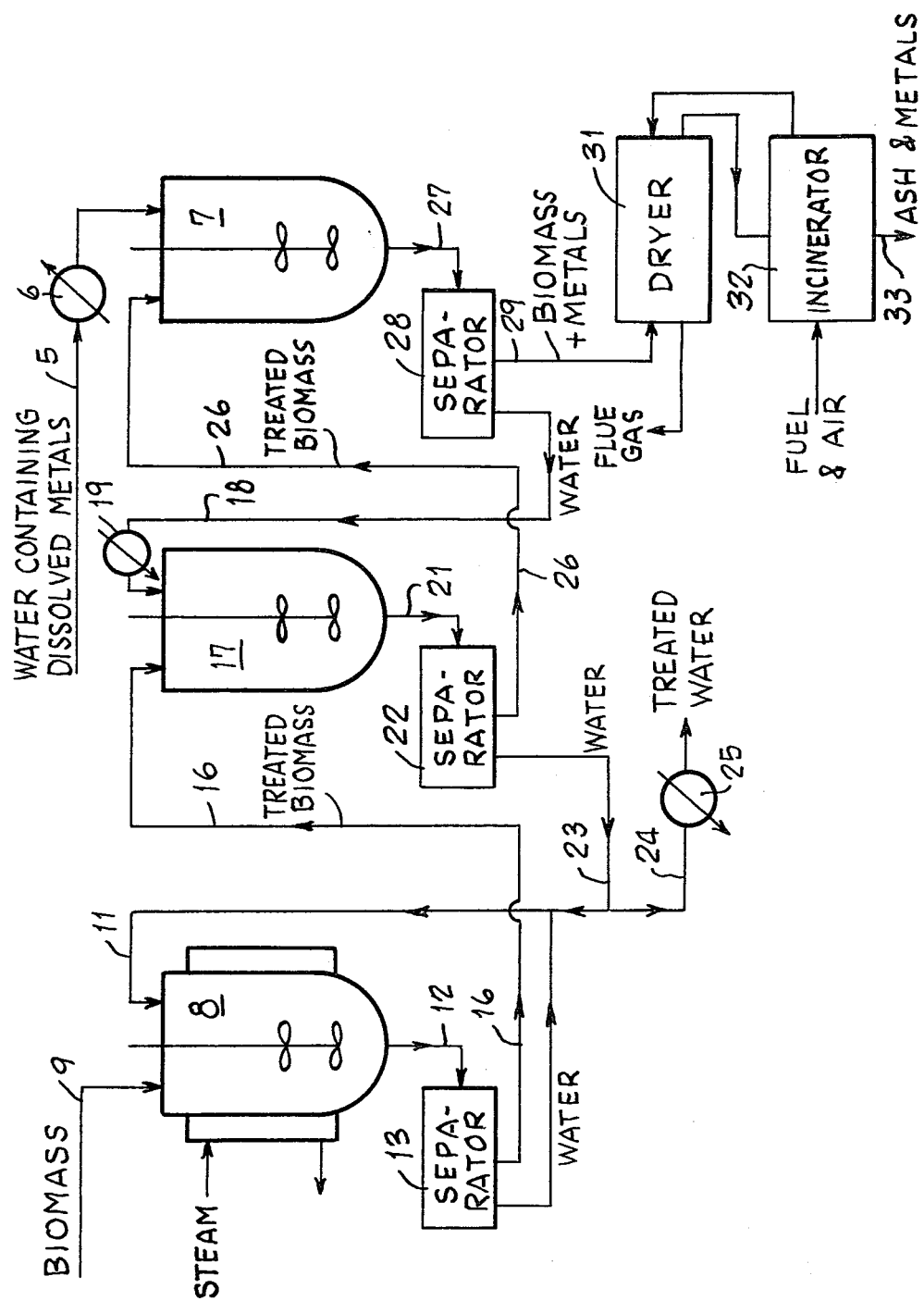

RECOVERY OF METALS

This invention relates to a process for separating metals from aqueous media containing dissolved metal salts by treatment with a killed fungus. The process is particularly effective for the recovery of precious metals, including platinum, rhodium, palladium, ruthenium, iridium, and gold from dilute aqueous solutions.

Waste waters from metallurgical processes of various types contain dissolved salts of platinum, rhodium, palladium, ruthenium, gold, iridium, and silver, as well as base metals, such as zinc, aluminum, iron, copper, tin and nickel. The process of this invention provides a simple, relatively low-cost method for recovering metals present in solutions of relatively low concentrations in industrial waste waters, especially in metallurgical waste waters, and in other aqueous media, such as ground waters, sea water, and the like. This invention is particularly useful for the recovery of metals from acidic solutions, e.g., solutions having a pH of less than 4.

The precipitation of gold, silver, platinum and palladium from acidic solutions by means of dried fungus of the genus Aspergillus has been reported by Mineev, G. E. et al. "Use of Microorganisms for Noble Metal Precipitation from Acid Industrial Solutions", Anal. Tecknol. Blagorod. Metal, 1971, 347-349

A copending patent application Ser. No. 120,798, filed concurrently herewith, discloses a method for recovering of both precious metals and base metals from aqueous solutions by treatment with live fungi.

The present invention provides a process for recovering various metals from aqueous solutions of water-soluble metal compounds by contacting such solutions with killed filamentous fungi commonly called molds which effectively sequester the metals into or onto themselves in water-insoluble metal forms.

By the process of the present invention, metal values in aqueous solutions in soluble form can be recovered in insoluble form. The process is especially useful for the recovery of precious metals from industrial waste waters. It has been discovered that killed molds have the ability to convert metals in soluble form in aqueous solutions to water insoluble metal forms and to accumulate these metals in the fungal mass. The metals so converted and concentrated in the treated fungal mass may be readily recovered from the aqueous media and from the fungus by relatively simple methods, including filtration and incineration of the separated fungus.

In the process of this invention, metal is recovered from an aqueous medium containing the metal in soluble form by contacting the aqueous medium with one or more killed molds for a period of time sufficient to convert the metal to an insoluble form, and thereafter separating the metal from the aqueous medium and from the dead fungus.

The present invention may be employed to recover either precious metals or base metals. For example, the process of this invention may be used to recover, in insoluble forms, the precious metals platinum, rhodium, palladium, ruthenium, iridium, and gold. Base metals which may be recovered by this process include, but are not limited to, zinc, aluminum, iron, copper, nickel, cobalt, manganese, and chromium. Other metals which may be recovered by use of the process of this invention include rhenium, silver, boron, tin, and iridium.

The recovery of metals in the process of this invention is accomplished through the use of microbiological organisms, specifically fungi called molds, which have been killed, for example, by heat or acid treatment effective to kill the fungus without drying or substantial degradation. Fungi which have been found useful in the process of this invention are those molds which are commonly found in surface water, tap water from municipal water supplies, and acidic waters containing dissolved metals. Samples of fungi taken from refinery process waste waters containing precious metals including gold, platinum and palladium, and base metals including copper, iron, aluminum and lead, from the metals refineries of Engelhard Minerals & Chemicals Corporation at Newark, and East Newark, N.J., contained fungi identified as species of Cladosporium, Penicillium, Trichoderma, a black cephalosporial mold, designated as Black Fungus, and a black chlamydosporial mold, identified as a non-sporulating strain of Aureobasidium, hereinafter designated Black Mycelium. These various fungi were isolated and separately cultured. After heat treatment by autoclaving to kill the fungi, all were found effective for the recovery of both precious metals and base metals from aqueous solutions.

In a preferred embodiment of the present invention, fungi are cultured in a separate culture medium, killed, and used to process aqueous solutions containing precious metals for the recovery of metal values from the solutions.

Fast growing species of Penicillium, Cladosporium, and other molds cultured commercially, are suitable for use in the process. Commercially cultured fungi often present disposal problems to the manufacturers employing them for the production antibiotics and enzymes. These waste products are also suited as sources of supply of fungus for use in the process of this invention. Alternatively or concurrently, waste nutrient solutions from such commercial cultures may be added to metallurgical refinery process waste waters in accordance with this invention to supply nutrients to promote the growth of fungi in the metallurgical waste water.

The fungus cultures which are employed in the process of this invention may be prepared and maintained by conventional biological procedures well known in the art. Either a single fungus species or a mixture of fungi may be used in the process. Usually the fungi mentioned are admixed with one another in their natural environment; such naturally occurring mixtures may be employed in the process.

An organic carbon nutrient source serves to support the metabolism of the fungi. Thus, the growth of the fungal species of Cladosporium, Penicillium, and Trichoderma is enhanced by the presence of various carbohydrates, formic acid, citric acid, methyl alcohol and mineral oil, among other organic compounds.

In the process of this invention, the fungus may be killed, for example, by heating it in an aqueous medium to a temperature in the range of 85° to 150° C., and thereafter an aqueous medium containing metals in solution contacted with the heat treated fungus for a period of time sufficient to convert soluble metals in the solution to insoluble metal forms sequestered or accumulated by the treated fungus. The solution may be treated at any temperature ranging from about freezing to 150° C. or higher. For preferential recovery of precious metals from a solution containing base metals as well as precious metals, the pH of the solution undergoing treatment should be maintained in the range of 2 to 3.

Fungal cultures may be prepared by conventional biological procedures, heat treated, and then introduced into a container or reservoir in which the metal-containing aqueous medium is located.

The separation of the biomass from the various aqueous media may be carried out by conventional methods, such as filtration or centrifugation; centrifugal separation is generally preferred since filtration media are clogged to varying degrees by fungal cells.

The recovered metals may be separated from the fungus concentrate by drying and calcining the biomass to leave a residue of ash and finely-divided metals or metal compounds. The finely divided metals or their compounds may, in turn, be separated from one another, where desired, by conventional physical separations methods.

The process of this invention is illustrated in the accompanying drawing which is a diagrammatic representation of one specific preferred embodiment of means for carrying out the process of the invention.

With reference to the single FIGURE of the drawing, an aqueous medium, such as an acidic waste water, containing one or more metals in solution is fed through line 5 and heater 6 into a metals recovery tank 7, which may be equipped with a stirrer and jacketed or insulated to maintain a controlled temperature within the tank. A fungal biomass containing, e.g., Cladosporium, is fed into a tank 8 through line 9 where it is heated to a temperature sufficient to pasteurize the mass and kill the fungi contained therein. Tank 8 may be provided with a stirrer and means, e.g., a steam jacket, for heating the contents of the tank to the desired temperature to kill the fungus. Water may be introduced into tank 8 through line 11 in an amount sufficient to maintain a pumpable slurry of solids and liquid in tank 8.

Killed fungus is withdrawn continuously or intermittently from line 12 to a separator 13, preferably a centrifuge, wherein water is separated from the solids and the water recycled through line 11 to treating tank 8. The separated solids are passed through line 16 to a second metals separation tank 17 where they are admixed with water previously treated for metals removal in separation tank 7, the water entering tank 17 through line 18 and cooler 19.

A slurry of biomass and treated water is drawn from tank 17 through line 21 to separator 22, preferably a centrifuge, where treated water is separated from the fungal solids. Treated water from separator 22 is discharged through line 23 to line 24 as a product of the process. Part of the treated water from line 23 may be supplied via line 11 to treater tank 8 as required. A cooler 25 may be provided for cooling the treated water, suitably by heat exchange with water from line 5. In other words, heater 6 and cooler 25 may be interconnected or may, in fact, comprise a single heat exchanger. Similarly, cooling of water in cooler 19, which, in turn, cools hot biomass from line 18, may be supplied by heat exchange with water entering the system through line 5.

Biomass from separator 22 is passed through line 26 to metals recovery tank 7 where it is mixed with the incoming aqueous feed stream containing metals in solution. Thus the aqueous feed stream is brought into staged countercurrent contact with treated biomass from tank 8, fresh heat treated fungus first coming into contact with previously treated water in tank 17 and then into contact with the fresh feed stream in tank 7.

A slurry of treated water and biomass is withdrawn from tank 7 through line 27 to separator 28, preferably a centrifuge, where treated water is separated from biomass containing recovered metal. The treated water flows through line 18 to tank 17 for further treatment while the dewatered biomass is passed through line 29 to a dryer 31 and an incinerator 32. Ash and recovered dry powdered elemental metals are discharged through line 33 to further processing for recovery of the various metals by known methods. The process may serve as a means for disposing of waste biomass and purifying water containing dissolved metals without necessarily serving as a means for recovering elemental metals.

It will be apparent from the above description of the process of this invention that the process may be employed as an ecological tool to purify waste water, including industrial waste water, or to purify natural bodies of water. For example, the process may be used to recover metals from the various process liquors and ore tailings encountered in the hydrometallurgical refining of metallic ores. The process of this invention may also serve as a means for recovering valuable metals from waters from wells or springs or from aqueous media employed in in-situ leaching operations as a means for mining metals from natural ore bodies. The invention may also be useful in the production of high purity metals and metal salts, and in the recovery of metals from contaminated solutions comprising metal-containing aqueous media spilled or leaked from industrial equipment.

The following examples illustrate the effectiveness of the heat treated fungi for recovery of various metals.

EXAMPLES

An acidic solution of water soluble metal salts was prepared to simulate an industrial waste water. The solution contained platinum, rhodium, palladium, ruthenium, gold, iron, copper, aluminum, and iridium in the amounts indicated in Table I under the heading "Control Sample".

Fungi of each of the species of Penicillium, Trichoderma, and Cladosporium, and the Black Mycelium, and the Black Fungus were separately cultured in a soy bean meal medium on a rotary shaking machine at 28° C. for 6 days. The cultures were heated to a temperature in excess of 100° C., cooled and centrifuged at 6000 rpm in a Lourdes VRA rotor for 10 minutes and the supernatant liquid was discarded. The killed fungus cells were then washed with distilled water, recentrifuged, and the supernatant liquid again discarded. The cells were suspended in distilled water and filtered through Reeve Angel No. 802 paper. Ten grams of the resultant biomass were placed in a 2000 ml Erlenmeyer flask with 200 ml of the salt solution and the flask was placed on a reciprocal shaking machine for 40 hours at 28° C. A control sample consisting of 200 ml of the salt solution was placed in a similar flask on the shaking machine. At the end of the test period, the contents of the two flasks were separately filtered through Reeve Angel No. 902 paper.

The concentration, in milligrams per liter, of the metals remaining in the filtrate was determined by analysis with the results indicated in the following table. In the table, the percentage recovery is calculated by the difference between the metal concentration in the filtrates and the metal concentration in the control sample.

TABLE 1

| Metal | Control Sample mg/l | Example 1 Cladosporium Pencillium Filtrate mg/l | Percent Removed | Example 2 Trichoderma Filtrate mg/l | Percent Removed | Example 3 Filtrate mg/l | Percent Removed |
|---|---|---|---|---|---|---|---|
| Pt | 2.1 | 0.023 | 99+ | 0.36 | 83 | 0.17 | 92 |
| Pd | 1.8 | 0.011 | 99 | 0.57 | 68 | 0.35 | 81 |
| Rh | 0.86 | 0.40 | 54 | 0.62 | 28 | 0.71 | 17 |
| Ir | 0.90 | 0.47 | 48 | 0.15 | 83 | 0.32 | 64 |
| Ru | 0.82 | 0.19 | 77 | 0.37 | 55 | 0.25 | 70 |
| Au | 0.75 | 0.013 | 98 | 0.17 | 77 | 0.061 | 92 |
| Al | 40 | 24 | 40 | 40 | 0 | 43 | — |
| Fe | 6.1 | 1.0 | 84 | 5.0 | 18 | 5.0 | 18 |
| Cu | 4.3 | 0.72 | 83 | 3.4 | 21 | 5.1 | — |

TABLE II

| Metal | Control Sample | Example 4 Black Fungus Final Conc. | Percent Removed | Example 5 Black Mycelium Final Conc. | Percent Removed |
|---|---|---|---|---|---|
| Pt | 2.1 | 0.13 | 94 | 0.065 | 97 |
| Pd | 1.8 | 0.054 | 97 | 0.32 | 82 |
| Rh | 0.86 | 0.36 | 58 | 0.83 | 3 |
| Ir | 0.90 | 0.45 | 50 | 0.36 | 60 |
| Ru | 0.82 | 0.16 | 80 | 0.25 | 70 |
| Au | 0.75 | 0.023 | 97 | 0.055 | 93 |
| Al | 40 | 15 | 62 | 53 | — |
| Fe | 6.1 | 0.6 | 90 | 6.6 | — |
| Cu | 4.3 | 1.0 | 77 | 5.7 | — |

As can be seen from the tables, all fungi demonstrated in varying degrees a selectivity for the removal of platinum, rhodium, palladium, ruthenium, and gold. Iridium was removed to a lesser extent. The heat treated Cladosporium gave essentially complete removal of platinum, palladium and gold from the solution. The base metals were removed to a greater and more consistent degree by the Cladosporium and the black fungus than by the other fungi.

Since all of the fungal species tested are widespread in the surrounding natural environment, they will eventually all propagate in a non-sterile system that is initially innoculated with only one of the species. If a single species is desired, it must therefore be periodically renewed by replacement with a pure culture of that species. The fungi employed in the examples were all separated and propagated from biological growths naturally present in samples of Engelhard's New Jersey refinery waste waters.

What is claimed is:

1. A process for removing metal from an aqueous medium containing in solution one or more metals selected from the group consisting of platinum, rhodium, palladium, ruthenium, gold, rhenium, silver, iridium, zinc, aluminum, iron, copper, nickel, cobalt, manganese, chromium, boron and tin; which comprises contacting said aqueous medium containing at least one of said metals with a killed fungus or a mixture of killed fungi from the family of molds for a period of time sufficient to convert said metal from soluble form to an insoluble form followed by the separation of the resulting aqueous medium from the killed fungus or killed fungi containing said removed metal.

2. The process according to claim 1 wherein said fungus is a species of Cladosporium.

3. The process according to claim 1 wherein said fungus is a species of Penicillium.

4. The process according to claim 1 wherein said fungus is a species of Trichoderma.

5. A process according to claim 1 wherein said killed fungus is produced by heating live fungus to a temperature in the range of 85° C. to 150° C.

6. The process of claim 1 wherein the process of recovery of metals from solution is carried out at a temperature in the range of 5° to 150° C.

7. A process according to claim 1 wherein the resulting treated solution is separated from the killed fungus containing metal values separated from the water, and metals are recovered from the separated killed fungus.

8. The process of claim 7 wherein metal in solution comprises at least one precious metal.

9. The process of claim 7 wherein the aqueous medium comprises industrial process waste water.

10. The process of claim 7 wherein the aqueous medium comprises an acidic metallurgical process solution containing at least one precious metal.

11. The process of claim 7 wherein precious metals are preferentially recovered from a solution containing precious metals and base metals by maintaining the pH of said solution within a range of 2 to 3.

12. The process of any one of claims 1, 2, 3 or 4 wherein the metal is one or more of platinum, palladium, rhodium, iridium, ruthenium, gold, aluminum, iron and copper.

13. The process of claim 12 wherein the metal is one or more of platinum, rhodium, palladium, ruthenium and gold.

* * * * *